United States Patent
Assa et al.

(10) Patent No.: US 6,950,396 B2
(45) Date of Patent: Sep. 27, 2005

(54) TRAFFIC CONTROL METHOD AND SYSTEM

(75) Inventors: Eyal Assa, Hod Hasharon (IL); David Berechya, Tel Mond (IL)

(73) Assignee: Seabridge Ltd., Hod Hasharon (IL)

( * ) Notice: Subject to any disclaimer, the term of this patent is extended or adjusted under 35 U.S.C. 154(b) by 910 days.

(21) Appl. No.: 09/812,716

(22) Filed: Mar. 20, 2001

(65) Prior Publication Data

US 2002/0176358 A1 Nov. 28, 2002

(51) Int. Cl.$^7$ .............................. H04J 1/16; H04L 12/56
(52) U.S. Cl. ..................... 370/230.1; 370/412; 370/414
(58) Field of Search ................... 370/230–235, 370/389, 395.21, 395.41, 395.42, 395.43, 412–419, 229, 468, 352; 711/104

(56) References Cited

U.S. PATENT DOCUMENTS

| | | | |
|---|---|---|---|
| 5,541,912 A | | 7/1996 | Choudhury et al. ........... 370/17 |
| 5,757,771 A | * | 5/1998 | Li et al. ..................... 370/235 |
| 5,764,641 A | | 6/1998 | Lin ............................. 370/412 |
| 5,793,747 A | * | 8/1998 | Kline .......................... 370/230 |
| 5,901,139 A | | 5/1999 | Shinohara .................... 370/232 |
| 5,901,147 A | | 5/1999 | Joffe ........................... 370/412 |
| 6,014,367 A | | 1/2000 | Joffe ........................... 370/230 |
| 6,034,945 A | | 3/2000 | Hughes et al. ............... 370/230 |
| 6,038,217 A | * | 3/2000 | Lyles .......................... 370/235 |
| 6,044,060 A | | 3/2000 | Jones ........................... 370/230 |
| 6,049,527 A | | 4/2000 | Isoyama et al. ............. 370/235 |
| 6,067,301 A | * | 5/2000 | Aatresh ....................... 370/418 |
| 6,076,112 A | | 6/2000 | Hauser et al. ............... 709/234 |
| 6,081,504 A | | 6/2000 | Tanaka et al. ............... 370/230 |
| 6,091,708 A | | 7/2000 | Matsunuma ................. 370/233 |
| 6,091,725 A | | 7/2000 | Cheriton et al. ............ 370/392 |
| 6,529,499 B1 | * | 3/2003 | Doshi et al. ................. 370/352 |
| 6,570,876 B1 | * | 5/2003 | Aimoto ....................... 370/389 |
| 6,680,933 B1 | * | 1/2004 | Cheesman et al. .......... 370/352 |

* cited by examiner

*Primary Examiner*—Huy D. Vu
*Assistant Examiner*—Lee Khuong
(74) *Attorney, Agent, or Firm*—Fitch, Even, Tabin & Flannery

(57) ABSTRACT

A system and method of scheduling traffic from a plurality of queues onto a link is disclosed. At least one of the queues has an agreed bandwidth requirement and at least one of the queues has no agreed bandwidth requirement. The method comprises the steps of assigning a weight to each queue having an agreed bandwidth requirement, the weight being determined in dependence on the bandwidth requirement, grouping the queues having no agreed bandwidth requirement into a group, Q*, and assigning a weight to the group, and scheduling the queues for transmission on the link in dependence on their assigned weight and on a last transmission time for the respective queue, wherein if a scheduled queue has no traffic to transmit another queue is scheduled, the group Q* being scheduled after the other queues.

20 Claims, 4 Drawing Sheets

TRAFFIC CONTROL METHOD AND SYSTEM

FIELD OF THE INVENTION

The present invention is in the general field of traffic management systems for communication networks.

BACKGROUND OF THE INVENTION

Networks are used to transfer voice, video and data between various network devices. Network devices such as switches are located within networks to direct the transfer of network traffic between various devices. Network traffic is typically bursty in nature. In order to compensate for network traffic bursts, memory queues are incorporated into network devices. These allow the device to temporarily sore traffic when the incoming rate is higher than an available outgoing rate. When more than one queue has traffic and each queue is contending for the same bandwidth, some of the traffic is required to wait in the queues and some mechanism, is needed to determine how traffic contention is resolved.

In order to resolve contention and provide a Quality of Service guarantee or some method of fair contention resolution to traffic, queue management algorithms must be implemented in the network devices. In one algorithm referred to as "priority queuing", contending queues are assigned different priorities and traffic is forwarded from the queues in strict priority order. For example, referring to FIG. 1, four queues $Q_1$, $Q_2$, $Q_3$ and $Q_4$ (designated 1–4 respectively) hold packetised traffic that is to be forwarded on link (20). The link (20) has a finite bandwidth $R_L$ that must be shared by the traffic. To resolve the contention, the queues are prioritized and packets from the queues are forwarded to the link (20) in strict priority order under the control of a queue manager (10), such as a switch. While priority queuing works well when there is little contention, where there is contention traffic from higher priority queues is forwarded at the expense of traffic from lower priority queues. In this situation, traffic from high priority queues consume the majority of finite link bandwidth and lower priority queues are starved of bandwidth and back-up the network device architecture, potentially increasing latency to the point where packets are dropped. Dropped packets may require an entire stream to be retransmitted, thereby defeating the purpose of prioritising queues in the first place.

When traffic is to be carried in an ATM network a predetermined path called a "virtual, circuit" is agreed between an initiating end point and nodes within the network such that, for the duration of the connection, the agreed traffic from the end point can use that particular path. When the path is established, a "contract" is made by which the network agrees to carry the traffic and to meet any quality of service and minimum bandwidth guarantees so long as the traffic stays within specified traffic descriptors. Traffic in an ATM network is formatted into equal sized cells or packets.

Where a number of links are to contend for bandwidth, on a single outgoing link, it is quite likely that some of the links will have an agreed contract for a proportion of the outgoing link's bandwidth. However, it is also quite likely that other links without contracted bandwidth on the outgoing link may also require access to the link. These are accepted on a "best-effort" basis, the outgoing link giving any uncontracted bandwidth to these links. Obviously, multiplexing of the traffic streams from the links onto the outgoing link must be managed in a fair way whilst satisfying the established contracts. Fair sharing algorithms and round-robin type algorithms are based primarily on priority levels determined in dependence on the contracted bandwidth for each link. Thus, links without specific contracted bandwidth, such as those that have been accepted on a "best effort" basis are ignored whilst there is traffic pending in contracted links or whilst it is a contracted link's turn to transmit on the outgoing link. One way that has been suggested to overcome this problem is to give those links that are not contracted a weight corresponding to a low priority so that the links are multiplexed onto whatever remains after the contracted links are multiplexed onto the link. However, such an arbitrary assignment of bandwidth does not result in efficient sharing of the outgoing link. Furthermore, bandwidth on the outgoing link is reserved for each link in dependence of its weight, irrespective of whether that link has anything to transmit. Thus, a high priority link without any data to transmit takes up bandwidth on the outgoing link that could be used to transmit data from the uncontracted links.

One algorithm that attempts to resolve issues surrounding contention management without the above problems is "Weighted Fair Queuing" (WFQ). Contending queues are assigned weights and packets are forwarded from queues in proportion to the weights assigned to each queue. For example, referring again to FIG. 1, if the queue manager (10) was a Weighted Fair queue controller, the four queues would be assigned a weight that represents the amount of bandwidth that is reserved for that queue. If the total available bandwidth of the link were 100 bytes per second, then with queue weights assigned as 20%, 25%, 15% and 40% to $Q_1$, $Q_2$, $Q_3$ and $Q_4$ respectively, $Q_1$ would be allocated 20 bytes per second on the link, $Q_2$ would be allocated 25 bytes per second, $Q_3$ 15 bytes per second and $Q_4$ 40 bytes per second. The queue manager ensures queues have fair access to the outgoing link whilst satisfying the allocated bandwidths. In one implementation of the weighted fair queue algorithm, a linear array is defined. Each array element represents a transmission time on the outgoing link. Queues are scheduled by linking them to one of the elements in the array, the order of transmission being determined by the order of the queues in the array. Once a transmission is made from a queue according to the schedule, the position of the queue within the array is recalculated. The recalculation schedules the queue further along the array, the exact position being calculated in dependence on the queues assigned weight.

Whilst the basic Weighted Fair Queue algorithm works well for preventing starvation that occurs in priority queuing and establishes a maximum flow rate for each queue, link bandwidth is still wasted because the percentage of link bandwidth is reserved for a particular queue is reserved whether or not there are packets, waiting. Furthermore, there is no apparent way of distributing excess bandwidth between other queues because queues do not have priority assigned relative to one another.

In the past, the above problem is usually approached by the implementation of a scheduler based on a linear array, such as that for the weighted fair queue scheduler discussed above. However, one problem with such an approach is that in order to obtain a high granularity (granularity is a measurement of the minimum ban width division of the outgoing link that can be allocated) the array must be made very large. This is because the size of the array determines the minimal bandwidth (if the array is of size N, the minimum bandwidth supported will be 1/N*(ink Rate)). This is a particular problem in real-time devices since the addition of a new stream requires the whole array needs to be reconfigured, a task which could be impossible to perform without interrupting transmission scheduling for large periods of time.

SUMMARY OF THE INVENTION

According to one aspect of the present invention, there is provided a method of scheduling traffic from a plurality of queues onto a link, at least one of the queues having an agreed bandwidth requirement and at least one of the queues having no agreed bandwidth requirement the method comprising the steps of:

assigning a weight to each queue having an agreed bandwidth requirement, the weight being determined in dependence on the bandwidth requirement;

grouping the queues having no agreed bandwidth requirement into a group, $Q^*$, and assigning a weight to the group $Q^*$;

scheduling the queues for transmission on the link in dependence on their assigned weight and on a last transmission time for the respective queue, wherein if a scheduled queue has no traffic to transmit another queue is scheduled, the group $Q^*$ being scheduled after the other queues.

The present invention seeks to provide a traffic scheduling method and an associated system that is capable of scheduling a number of queues of traffic having an allocated proportion of the bandwidth of a link and one or more queues of traffic without an allocated bandwidth. A particular advantage of the present invention is that unused bandwidth allocated to a link is reclaimed and used for other links. Furthermore the present invention seeks to provide such a method and system that is able to offer a high level of granularity.

Queues that do not have an agreed bandwidth requirement (typically those accepted on a best effort basis or with very cheap link access contracts) are grouped into a group $Q^*$ and treated as a special, queue. Effectively, the group is treated as one logical queue that is allocated unused bandwidth as and when it is available.

Whilst the present invention is primarily intended for use with networks having fixed size protocol data units (PDUs), such as cells in ATM (Asynchronous Transfer Mode) networks, it could also be adapted for use in networks having variable sized PDUs such as IP (Internet Protocol) networks.

A weight for a queue having an agreed bandwidth requirement may be determined in dependence on the ratio of the queue's required bandwidth the available link bandwidth, a queue with a low weight being scheduled for transmission before a queue with a higher weight.

A value, STEP, may be defined as the lowest assignable weight, wherein the weight $W_N$, for a queue, $Q_N$, is calculated as:

$$W_N = \frac{RL}{RN} \times STEP$$

where $R_L$ is the link bandwidth and $R_N$ is the queue's required bandwidth.

The group $Q^*$ may be assigned a weight of STEP.

The step of scheduling queues may include the steps of:
maintaining a global counter, G;
maintaining a counter for each queue, counter $C_N$ being the counter for queue $Q_N$;
incrementing $C_N$ by the $W_N$ and G by STEP each time a queue, $Q_N$, is scheduled for transmission and has traffic to transmit, wherein a queue, $Q_N$, is scheduled for transmission only if $C_N <= G$.

The step of scheduling queues may further comprise the step of ordering the queues in increasing rank of their respective weights, the group $Q^*$ being ordered last, wherein the step of scheduling queues processes the queues in accordance with said order.

The method may further comprise the steps of assigning the global counter, G, a maximum size in bits and determining an end point, U, $$U = 2^{(max\ size\ in\ bits\ -1)}$$

wherein, when G reaches or exceeds the value of U, G is reset to a predetermined value, L, and counters $C_N$ are reset to $C_N-(G-L)$ or 0, whichever is greater The predetermined value, L, may be set at 2×STEP.

The maximum usable weight may be set at U-STEP.

According to another aspect of the present invention., there is provided a traffic control system comprising a traffic controller arranged to process traffic from a plurality of queue's to schedule the traffic on an outgoing link, the plurality of queues including at least one queue having an agreed bandwidth requirement and at least one queue having no agreed bandwidth requirement, the traffic controller being arranged to assign a weight to each queue having an agreed bandwidth requirement, the traffic controller determining the weight in dependence on the bandwidth requirement, to group the queues having no agreed bandwidth requirement into a group, $Q^*$, and assign a weight to the group, and to schedule the queues for transmission on the link in dependence on their assigned weight and on a last transmission time for the respective queue, wherein if a scheduled queue has no traffic to transmit another queue is scheduled, the group $Q^*$ being scheduled after the other queues.

The traffic controller may determine a weight for a queue having an agreed bandwidth requirement in dependence on the ratio of the queue's required bandwidth to the available link bandwidth, the traffic controller being arranged to schedule a queue with a low weight before a queue with a higher weight.

A predetermined value, STEP, may be stored in a memory as the lowest assignable weight, wherein the weight $W_N$, for a queue, $Q_N$, is calculated as:

$$W_N = \frac{RL}{RN} \times STEP$$

where $R_L$ is the link bandwidth and $R_N$ is the queue's required bandwidth.

The group $Q^*$ may be assigned a weight of STEP.

The traffic controller may schedule traffic from the queues by:
maintaining a global counter, G, in a memory;
maintaining a counter for each queue in a memory, counter $C_N$ being the counter for queue $Q_N$;
incrementing $C_N$ by the $W_N$ and G by STEP each time a queue, $Q_N$, is scheduled for transmission and has traffic to transmit, wherein a queue, $Q_N$, is scheduled for transmission only if $C_N <= G$.

The traffic controller may be arranged to order the queues increasing rank of their respective weights, the group $Q^*$ being ordered last, wherein the traffic controller processes the queues in accordance with said order.

The global counter, G, may be stored in a register of length n bits, the controller being arranged to monitor the register for when its value reaches or exceeds a value, U, where $$U=2^{(n-1)}$$

wherein, when G reaches or exceeds the value of U, G is reset to a predetermined value, L, and counters $C_N$ are reset to $C_N-(G-L)$ or 0, whichever is greater.

The traffic controller may include a data structure in a memory, the data structure including storage means for a link to each traffic element queued for transmission, an indicator as to the last transmission time for a queue and a schedule or each queue indicating the next transmission time for a queue, the traffic controller scheduling traffic in accordance with the contents of the data structure.

The traffic controller may further comprise a further data structure, the further data structure being a copy of the data structure, wherein upon receiving a further queue to schedule the traffic controller is arranged to recalculate a transmission schedule in the further data structure including the further queue and to then schedule traffic in accordance with the contents of the further data structure.

The traffic controller may comprise an Application Specific integrated circuit.

The traffic controller may comprise a field programmable gate array.

According to another aspect of the present invention, there is provided a computer-readable medium, on which is stored a computer program of instructions for a general purpose computer for scheduling traffic from a plurality of queues onto a link, at least one of the queues having an agreed bandwidth requirement an at least one of the queues having no agreed bandwidth requirement, comprising, in combination:

means for enabling the computer to assign a weight to each queue having an agreed bandwidth requirement, the means determining the weight in dependence on the bandwidth requirement;

means for enabling the computer to group the queues having, no agreed bandwidth requirement into a group, Q*, and to assign a weight to the group;

means for enabling the computer to schedule the queues for transmission on the link in dependence on their assigned weight and on a last transmission time for the respective queue, wherein if a scheduled queue has no traffic to transmit the means schedules another queue, the means scheduling the group Q* after the other queues.

BRIEF DESCRIPTION OF THE DRAWINGS

For a better understanding, the invention will now be described, by way of example only, with reference to the accompanying drawings, in which.

DETAILED DESCRIPTION OF A PREFERRED EMBODIMENT

Figure 1:
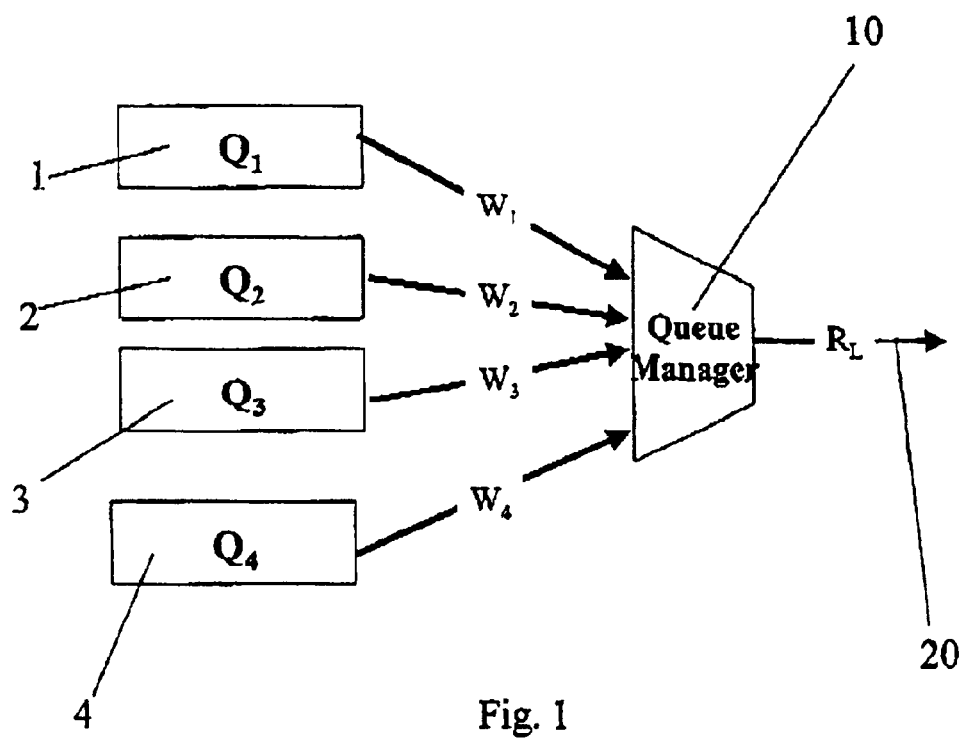
FIG. 1 is a schematic diagram of a traffic multiplexing system.
Figure 2:
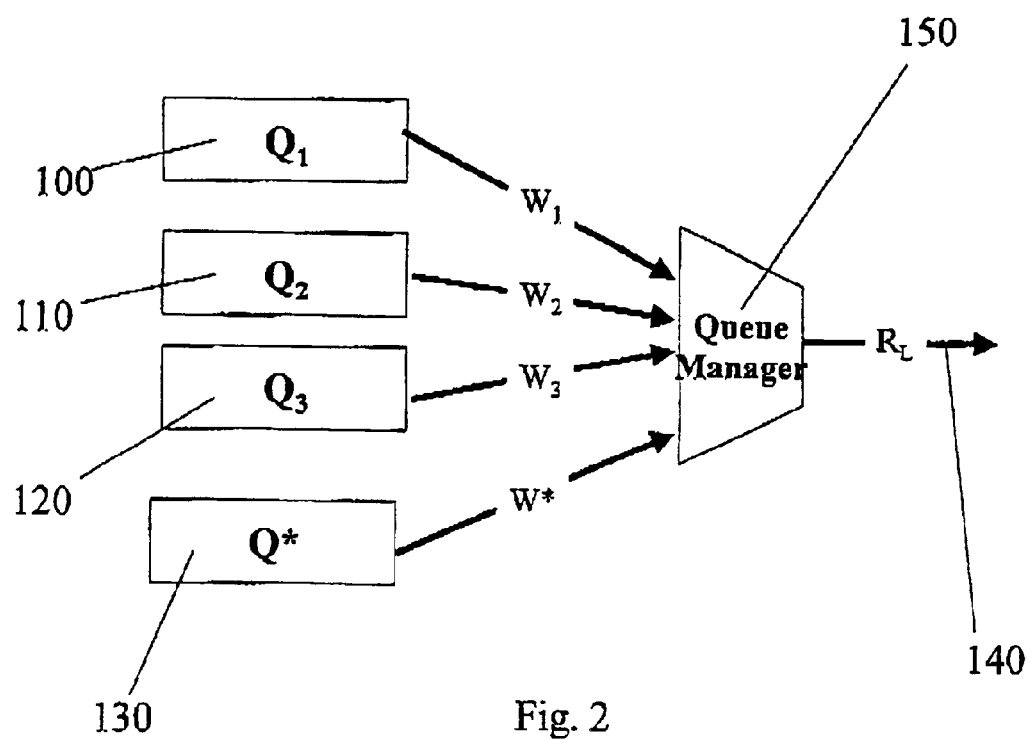
FIG. 2 is a schematic diagram of a traffic multiplexing system incorporating a traffic control system according to the present invention.

FIG. 2 is a schematic diagram of a traffic multiplexing system incorporating a traffic control system according to the present invention. A number of streams, N (of which 3 are shown and designated 100–120) which are contracted with the control system to each occupy a respective bandwidth $R_1$–$R_N$ of an outgoing link (140), are queued in respective queues $Q_1$–$Q_N$. The sum of $R_1$ to $R_N$ is less equal to the bandwidth $R_L$. Each link is given a weight $W_1$ to $W_N$ that is inversely proportional to the link's bandwidth. A parameter, STEP, is set as the period in time it takes to transmit a single cell. STEP is also the lowest assignable weight. Therefore, if a link is given the weight STEP it is allocated the bandwidth of the outgoing link $R_L$ and is always scheduled to transmit.

Note that $W_i$ is the weight associated with link i according to the following formula:

$W_i = R_L / R_i *$STEP rounded upward.

It can be seen if we wish to allocate a link half of the bandwidth of the outgoing link, the weight will be 2*STEP.

A special queue, Q* (130), is also established. All streams that do not have a contracted bandwidth are routed to his queue. Cells from the special queue are scheduled on a best effort basis after pending cells from the other queues have been transmitted. The weight for the special queue (W*) is set at STEP, although the scheduler (150) knows not to treat this queue as a normal queue and therefore does not allocate all bandwidth to this queue.

A global counter G is also maintained. The counter is incremented by STEP each cell time. A local counter ($C_N$) is also maintained for each link. Every time the queue corresponding to a link is selected to transmit, the corresponding counter C is incremented by its weight.

In order to select the queue to be allowed to transmit a cell for a particular cell time, each counter $C_i$ is compared with G. A queue, i, is allowed to transmit only when $C_i <= G$.

However this is not enough, since if we process the queues in an arbitrary order than the situation arises that no queue is allowed to transmit if the queue are ordered one way but one or more queues would have been allowed to transmit if the queues were ordered in some other way.

Therefore, in order for the system to be work-conserving (a critical requirement for real-time switches and systems), the queues are ordered by their respective weights $W_i$. Queues are ordered in increasing rank of $W_i$. However, the special queue Q* is always ranked last.

For example, two queues $Q_1$ and $Q_2$, having contracted bandwidths of 2 Mb/s and 1 Mb/s respectively may be controlled along with a number of best-effort streams queued at Q* for access to a link of 4 Mb/s, STEP is set at 32, therefore $W_1=64$, $W_2=128$ and $W*=32$. Table 1 shows the progression of the above scheduling algorithm for his example.

TABLE 1

| Transmission | 1 | 2 | 3 | 4 | 5 | 6 | 7 | 8 |
|---|---|---|---|---|---|---|---|---|
| G | 0 | 32 | 64 | 96 | 128 | 160 | 192 | 224 |
| $C_1$ | 0✓ | 64 | 64✓ | 128 | 128✓ | 192 | 192✓ | 256 |
| $C_2$ | 0 | 0✓ | 128 | 128 | 128 | 128✓ | 256 | 256 |
| C* | 0 | 0 | 0 | 0✓ | 32 | 32 | 32 | 32✓ |

The tick symbols following counter $C_i$ values indicate the counter selected for transmission. It will be seen that counter $C_1$ is selected at transmissions 1, 3, 5 and 7, $C_2$ is selected at transmissions 2 and 6 and counter C* is selected at transmissions 4 and 8.

The lowest granularity is achieved when the rate of the stream is high and its allocated weight is (STEP+1)/STEP. The granularity increases as the rate of a stream decreases.

Figure 3:
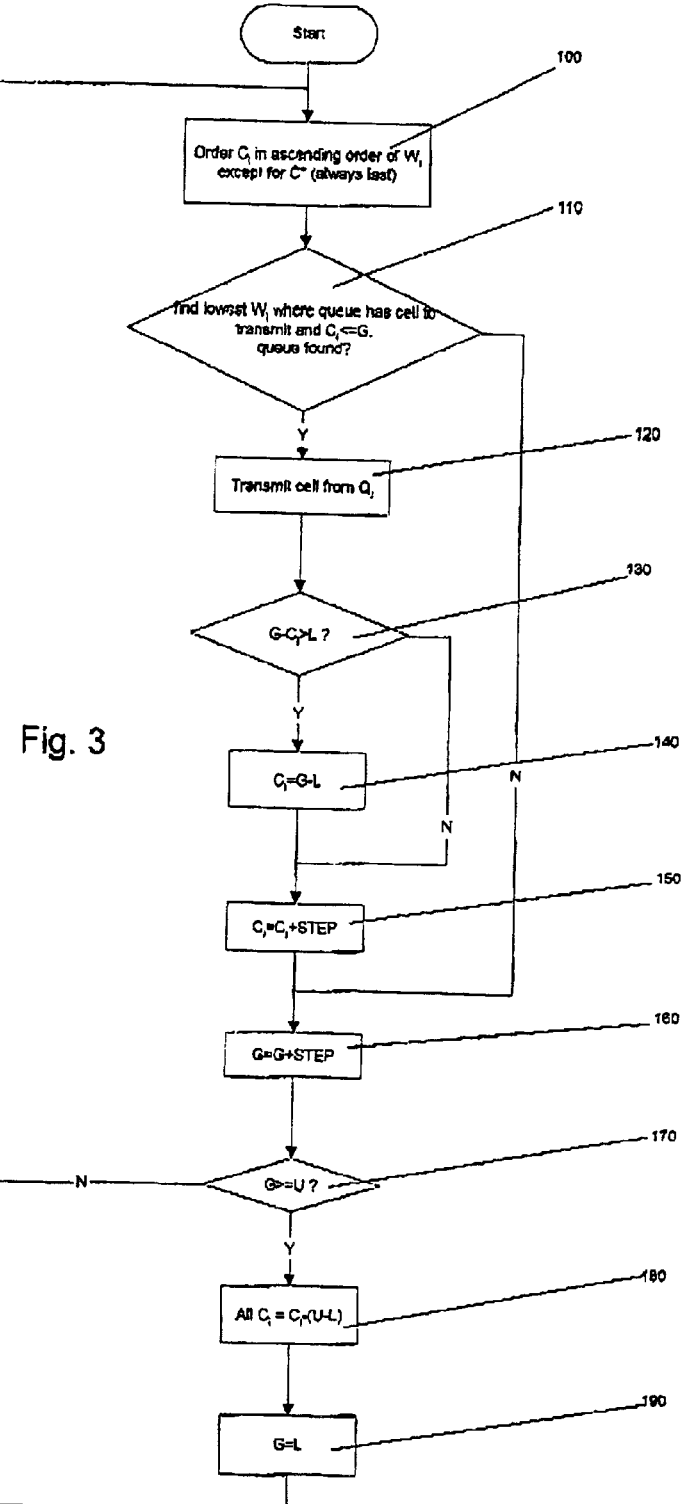
FIG. 3 is a flow chart illustrating the scheduling operation of the method according to a preferred aspect of the present invention; and, FIG. 4 is a block diagram of a data structure suitable for use with the method and system of the present invention in a real-time environment.

FIG. 3 is a flowchart of the steps of a scheduling algorithm according to a preferred aspect of the present invention.

It can be seen that the selection of the value of STEP has an effect on the granularity of the system. For example, if we have a link rate of 4 Mbit/sec and wish to set a weight for an agreed rate of 3 Mbit/sec, without STEP a weight of 4/3 rounded up (i.e. 2) would be given by prior systems. However, this would only result in a rate of 2 Mbit/sec. With a value of STEP set at 32, the weight would be 4/3×32, rounded up, which gives 43. Thus, the resultant rate would be 2.977 Mbit/sec.

Software implementations of scheduling algorithms run by a processor in a network device are acceptable in non real-time applications. In such implementations, the size of counters can be unlimited and the above scheduling method operates well. However, where the network device must multiplex traffic from ten of thousands of links and make scheduling selections in a fraction of a cell time, most software implementations are found to lack the required processing speed. In order to satisfy processing speed requirements, many schedulers are implemented in logic in ASICs (Application Specific Integrated Circuits) or FPGAs (Field Programmable Gate Arrays). In order to meet the processing speed requirements and limit complexity, such implementations need to use limited numbers of logic elements which in turn limits the size of counters that can be used.

The algorithm illustrated in. FIG. 3 is simple enough to be implemented in such a limited number of logic elements whilst being flexible enough not to limit the size of counters. In order to avoid unlimited sized counters, each is allowed to wrap around. Assuming, for example, that G is a counter of 18 bits. In this case a value that occupies half of the counter (in this example 17 bits) is set as the counter's end point. When the counter reaches or exceeds this value, it is reduced to a pre-set value U. The maximum size of a weight is determined by the usable size of the counter (17 bits) less the size of STEP. Therefore if STEP is set as 32 (5 bits) then weights can be a maximum of 12 bits long. A start value, L, for the counter G is selected, normally being 2×STEP.

At step 100, counters $C_1$ to $C_N$ an ordered in ascending order of $W_i$. Counter C* is placed last in the order. At step 110, the counter $C_i$ ordered first (lowest $W_i$) is compared with G. If the counter $C_i$ is less than or equal to G, the queue corresponding to the counter is selected to transmit a cell in step 120. If the queue did not have a cell to transmit then the next counter is selected. If the counter is not less than or equal to G, the next counter is checked until one is found that is less than or equal to G. In step 130, the magnitude of the counter $C_i$ in relation to G is checked. If G minus the counter, $C_j$, is greater than L, the counter $C_i$ is reduced to G minus L in step 140. This prevents a counter for a queue that has been inactive for some time dropping behind other counters due to the inactivity and then consuming all available bandwidth until the counter catches back up resulting in an uncontrolled burst of traffic. By increasing the value of the counter $C_i$ to a value closer to G, the queue associated with the counter $C_i$ is allowed to jump towards the front of the scheduling queue once after a period of inactivity and is then scheduled along with other queues. In step 150, the counter $C_i$ is incremented by STEP. In step 60, G is incremented by STEP. Returning to step 110, if no counter is less than G, the algorithm jumps directly to step 160.

In step 170, G is compared to U. If G is greater than or equal to the maximum set value for the counter it is reset to L in step 180 and all counters $C_1$ to C* are decremented by U minus L or zeroed, whichever is higher. The algorithm then continues at step 100.

Table 2 repeats the above example where the algorithm of FIG. 3 is applied, L is set at 64 and U is set at 256.

TABLE 2

| Transmission | 1 | 2 | 3 | 4 | 5 | 6 | 7 | 8 | 9 | 10 |
|---|---|---|---|---|---|---|---|---|---|---|
| G | 0 | 32 | 64 | 96 | 128 | 160 | 192 | 224 | 256 | 64 |
| $C_1$ | 0✓ | 64 | 64✓ | 128 | 128✓ | 192 | 192✓ | 256 | 256✓ | 128 |
| $C_2$ | 0 | 0✓ | 128 | 128 | 128 | 128✓ | 256 | 256 | 256 | 64✓ |
| C* | 0 | 0 | 0 | 0✓ | 32 | 32 | 32 | 32✓ | 64 | 0 |

In his example, at transmission 9, G reaches the limit set by U, G is reset to L (64) and $C_1$ to C* are decremented by U-L (192).

Figure 4:
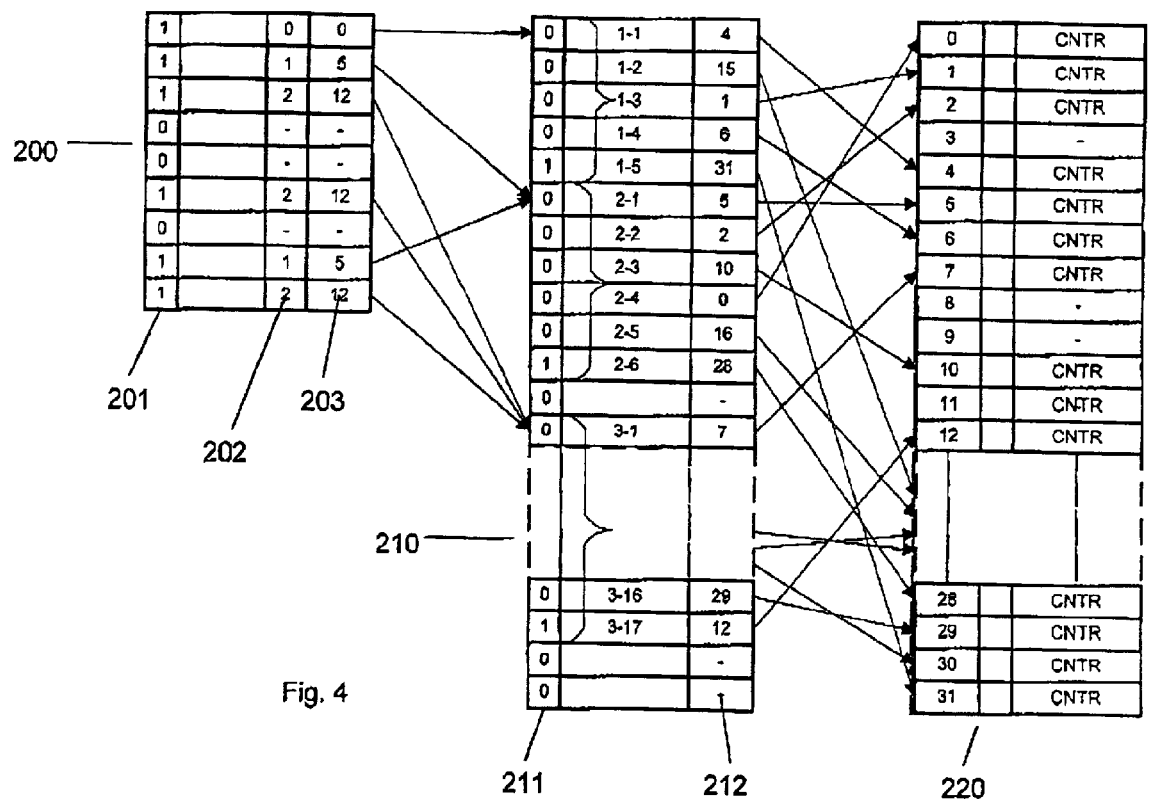

In order to configure the traffic controller when a new stream is added without affecting the existing streams, a double memory is used. A copy of the current traffic controller configuration is made and updated to incorporate the new stream. The controller is then directed to swap from the current configuration to the copy, at which point they reverse roles, the copy becoming the current configuration and vice-versa. The data structure used for one of the memories is illustrated in FIG. 4.

A table 200 holds data on the physical ports of the network device. The array has a row for each cell queued for transmission and includes a column 201 indicating whether the port is active, a column 202 indicating the port number and a column 203 indicating a row in an order table 210 for the port number.

The order table 210 includes a row for each transmission scheduled. The order table has a column. 211 indicating whether the row corresponds to the last transmission scheduled of the particular port number, and a column. 212 indicating a row in a counter table 220.

The present invention has been described with a certain degree of particularity but various alternations and modifications may be carried out without departing from the spirit and scope of the following claims:

What is claimed is:

1. A method of scheduling traffic from a plurality of queues onto a link, at least one of the queues having an agreed bandwidth requirement and at least one of the queues having no agreed bandwidth requirement, the method comprising the steps of:

a) assigning a weight to each queue having an agreed bandwidth requirement, the weight being determined in dependence on the ratio of the queue's required bandwidth to the available link bandwidth, a queue with a low weight being scheduled for transmission before a queue with a higher weight;

b) grouping the queues having no agreed bandwidth requirement into a group, Q*, and assigning a weight to the group; and c) scheduling the queues for transmission on the link in dependence on their assigned weight and on a last transmission time for the respective queue, wherein if a scheduled queue has no traffic to transmit another queue is scheduled, the group Q* being scheduled after the other queues;

wherein the weight $W_N$, for a queue, $Q_N$, is calculated as:

$$W_N = \frac{R_L}{R_N} \times STEP$$

where a value, STEP, is defined as the lowest assignable weight, $R_L$ is the link bandwidth and $R_N$ is the queue's required bandwidth.

2. A method according to claim 1, in which the group Q* is assigned a weight of STEP.

3. A method according to claim 2, in which the step of scheduling queues includes the steps of:
  maintaining a global counter, G;
  maintaining a counter for each queue, counter $C_N$ being the counter for queue $Q_N$;
  incrementing $C_N$ by the $W_N$ and G by STEP each time a queue, $Q_N$, is scheduled for transmission and has traffic to transmit, wherein a queue, $Q_N$, is scheduled for transmission only if $C_N <= G$.

4. A method according to claim 3, in which the step of scheduling queues further comprises the step of ordering the queues in increasing rank of their respective weights, the group Q* being ordered last, wherein the step of scheduling queues processes the queues in accordance with said order.

5. A method according to claim 4, further comprising the steps of assigning the global counter, G, a maximum size in bits and determining an end point, U, $$U = 2^{(max\ size\ in\ bits\ -1)}$$

wherein, when G reaches or exceeds the value of U, G is reset to a predetermined value, L, and counters $C_N$ are reset to $C_N-(G-L)$ or 0, whichever is greater.

6. A method according to claim 5, wherein the predetermined value, L, is set at 2×STEP.

7. A method according to claim 5, wherein the maximum usable weight is set at U-STEP.

8. A traffic control system comprising a traffic controller arranged to process traffic from a plurality of queue's to schedule the traffic on an outgoing link, the plurality of queues including:
  a) at least one queue having an agreed bandwidth requirement and at least one queue having no agreed bandwidth requirement:
  b) the traffic controller being arranged to assign a weight to each queue having an agreed bandwidth requirement in dependence on the ratio of the queue's required bandwidth to the available link bandwidth; the traffic controller being arranged
    i) to schedule a queue with a low weight before a queue with a higher weight,
    ii) to group the queues having no agreed bandwidth requirement into a group, Q*, and assign a weight to the group Q*, and
    iii) to schedule the queues for transmission on the link in dependence on their assigned weight and on a last transmission time for the respective queue, wherein, if a scheduled queue has no traffic to transmit another queue is schedule, the group Q* being scheduled after the other queues;

wherein the weight $W_N$, for queue, $Q_N$, is calculated as:

$$W_N = \frac{R_L}{R_N} \times STEP$$

wherein a predetermined value, STEP, is stored in a memory as the lowest assignable weight, and wherein $R_L$ is the link bandwidth and $R_N$ is the queue's required bandwidth.

9. A system according to claim 8, in which the group Q* is assigned a weight of STEP.

10. A system according to claim 9, in which the traffic controller schedules traffic from the queues by:
  maintaining a global counter, G, in a memory;
  maintaining a counter for each queue in a memory, counter $C_N$ being the counter for queue $Q_N$;
  incrementing $C_N$ by the $W_N$ and G by STEP each time a queue, $Q_N$, is scheduled for transmission and has traffic to transmit, wherein a queue, $Q_N$, is scheduled for transmission only if $C_N <= G$.

11. A system according to claim 10, in which the traffic controller is arranged to order the queues in increasing rank of their respective weights, the group Q* being ordered last, wherein the traffic controller processes the queues in accordance with said order.

12. A system according to claim 11, in which the global counter, G, is stored in a register of length n bits, the controller being arranged to monitor the register for when its value reaches or exceeds a value, U, where $U=2^{(n-1)}$
  wherein, when G reaches or exceeds the value of U, G is reset to a predetermined value, L, and counters $C_N$ are reset to $C_N-(G-L)$ or 0, whichever is greater.

13. A system according to claim 12, wherein the predetermined value, L, is set at 2×STEP.

14. A system according to claim 13, wherein the maximum usable weight is set at U-STEP.

15. A traffic control system according to claim 8, in which the traffic controller includes a data structure in a memory, the data structure including storage means for a link to each traffic element queued for transmission, an indicator as to the last transmission time for a queue and a schedule for each queue indicating the next transmission time for a queue, the traffic controller scheduling traffic in accordance with the contents of the data structure.

16. A traffic control system according to claim 15, further comprising a further data structure, the further data structure being a copy of the data structure, wherein upon receiving a further queue to schedule the traffic controller is arranged to recalculate a transmission schedule in the further data structure including the further queue and to then schedule traffic in accordance with the contents of the further data structure.

17. A traffic control system according to claim 15, in which the traffic controller comprises an Application Specific integrated circuit.

18. A traffic control system according to claim 15, in which the traffic controller comprises a field programmable gate array.

19. A computer-readable medium, on which is stored a computer program of instructions for a general purpose computer for scheduling traffic from a plurality of queues onto a link, at least one of the queues having an agreed bandwidth requirement and at least one of the queues having no agreed bandwidth requirement, comprising, in combination:
  means for enabling the computer to assign a weight to each queue having an agreed bandwidth requirement the means determining the weight in dependence on the ratio of the queue's required bandwidth to the available link bandwidth;

means for enabling the computer to group the queues having no agreed bandwidth requirement into a group, $Q^*$, and to assign a weight to the group; and means for enabling the computer to schedule the queues for transmission on the link in dependence on their assigned weight and on a last transmission time for the respective queue, wherein if a scheduled queue has no traffic to transmit the means schedules another queue, the means scheduling the group $Q^*$ after the other queues;

wherein the weight $W_N$, for a queue, $Q_N$, is calculated as:

$$W_N = \frac{R_L}{R_N} \times STEP$$

where a predetermined value, STEP, is stored in a memory as the lowest assignable weight, and wherein $R_L$ is the link bandwidth and $R_N$ is the queue's required bandwidth.

20. A program storage device readable by a machine and encoding a program of instructions for executing the method of scheduling traffic from a plurality of queues onto a link, at least one of the queues having an agreed bandwidth requirement and at least one of the queues having no agree bandwidth requirement, the method comprising the steps of:

a) assigning a weight to each queue having an agreed bandwidth requirement, the weight being determined in dependence on the ratio of the queue's required bandwidth to the available link bandwidth, a queue with a low weight being scheduled for transmission before a queue with a higher weight;

b) grouping the queues having no agreed bandwidth requirement into a group, $Q^*$, and assigning a weight to the group; and c) scheduling the queues for transmission on the link in dependence on their assigned weight and on a last transmission time for the respective queue, wherein if a scheduled queue has no traffic to transmit another queue is scheduled, the group $Q^*$ being scheduled after the other queues: wherein the weight $W_N$, for a queue, $Q_N$, is calculated as:

$$W_N = (R_L/R_N) * STEP$$

where a value, is defined as the lowest assignable weight, $R_L$ is the link bandwidth and $R_n$ is the queue's required bandwidth.

\* \* \* \* \*